United States Patent Office 3,441,544
Patented Apr. 29, 1969

3,441,544
PHOSPHORIC ACID ESTERS AND POLYMERS
THEREOF
Thomas E. Ronay, Oak Park, and Robert D. Dexheimer, Naperville, Ill., assignors to The Richardson Company, Melrose Park, Ill., a corporation of Ohio
No Drawing. Filed July 10, 1962, Ser. No. 208,921
Int. Cl. C07f 9/03; C08g 33/16
U.S. Cl. 260—78.5        7 Claims This invention is concerned with new and useful resin-forming compositions derived from phosphoric acids.

In the patent to Adams et al. 2,372,244, there is disclosed a process for making esters of acids of phosphorus by reacting alkylene oxides with phosphorus or phosphoric acid. For example, when orthophosphoric acid, represented by the formula

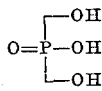

is reacted with propylene oxide, represented by the formula

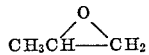

in a 1:1 mole ratio, a beta hydroxy phosphate ester is formed, which may be represented by the following formula:

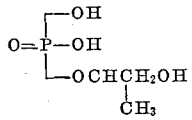

If the mole ratio of propylene oxide to orthophosphoric acid is increased, the remaining hydroxyl groups attached to the phosphorus atom may be esterified forming a tris-beta hydroxy phosphate ester. The same considerations apply to pyrophosphoric acid represented by the formula

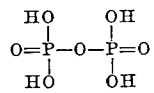

The secondary alcoholic hydroxyl groups of the phosphoric acid esters resulting from the above described esterification contain an active hydrogen and, accordingly, may likewise be reacted with additional alkylene oxide compounds to produce a chain type ester at each of the hydroxyl positions of the phosphoric acid. Compounds of this type are disclosed in the aforementioned Adams et al. patent, together with a generic formula representing the variety of compounds obtainable. Example I of the Adams et al. patent discloses a process for making a dipropylene glycol tri-substituted ester of phosphoric acid.

One of the principal objects of this invention is directed to forming resinous compositions derived from phosphoric acid esters.

Another object is the production of new phosphorus-containing resinous compositions having relatively wide application as coatings, films, impregnants, potting compounds and the like.

These and other objects are accomplished by initially esterifying a phosphoric acid, such as ortho or pyrophosphoric acid with certain oxides and, particularly, olefin oxides, followed by reacting the resulting ester with an unsaturated acid or acid anhydride, such as maleic anhydride, and then, preferably, again reacting the resulting product with an olefin oxide. This technique introduces double bond or unsaturated groups into the ester chains of the phosphoric acid esters enabling the esters to be reacted with other resin-forming agents by an addition reaction.

Exemplary olefin oxides which may be used are alkylene oxides such as ethylene oxide, propylene oxide, 1,2-butylene oxide, 1,2-acetylene oxide and diglycidyl ether and the related halogenated derivatives, for example, epichlorohydrin. Also contemplated as an olefin oxide are compounds which may be considered as substituted olefin oxides, such as styrene oxide.

For the initial ester formation with orthophosphoric acid, the olefin oxides are preferably used in a ratio of 3 to 12 moles of olefin oxide to one mole of phosphoric acid. As can be seen, using orthophosphoric acid as an example, three moles of olefin oxide will permit each of the hydroxyl groups of the acid to be esterified whereas 12 moles of olefin oxide will permit four olefin oxide units, in chain form, to be introduced at each of the hydroxyl positions of the orthophosphoric acid. Similar considerations apply in connection with pyrophosphoric acid except that initially 4 to 16 moles of olefin oxide are preferably used.

The reaction of olefin oxides with ortho or pyrophosphoric acids proceeds readily without a catalyst and may be easily controlled so as to obtain a phosphoric ester having the desired degree of reaction. Temperatures within the range of about 0° F. to 300° F. and at sufficient pressures to maintain the reactants in liquid phase may be used in forming the esters. The initial reaction product is usually water white and generally lower alkylene oxide derivatives are more water soluble than higher alkylene or aryl oxide derivatives. Certain aryl oxides, when reacted with phosphoric acids, tend to produce unsaturated derivatives, as disclosed in opening application of Ronay et al. SN 137,736, now Patent No. 3,112,-335. However, if the dehydration step disclosed in this copending application is omitted, the aryl oxide acts in the same manner as an alkylene oxide.

As previously indicated, an alcoholic hydroxyl group results from the esterification of the hydroxyl groups of the phosphoric acids, irrespective of the number of olefin oxide units introduced. To obtain the compounds contemplated by this invention, an unsaturated acid or acid anhydride is then reacted with the alcohol hydroxyl groups present in the esterified phosphoric acid. An exemplary product may be represented by the following, wherein orthophosphoric acid is initially reacted with three moles of epichlorohydrin followed by reaction with three moles of maleic anhydride:

(A) 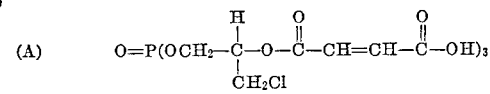

or

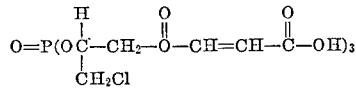

depending upon whether the reaction was conducted under basic or acid conditions. As of the present, it is believed that if the reaction is conducted under basic conditions, compounds represented by the Formula A above result and compounds represented by the Formula B are obtained under acid conditions.

When the foregoing product of Formula A, for example, is then subsequently reacted with three moles of epichlorohydrin, the following product is formed:

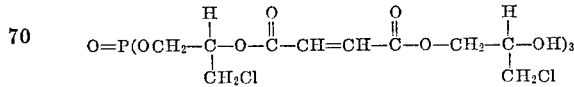

In addition to maleic acid other unsaturated dibasic acids or their acid anhydrides may be used if available, such as citraconic, methyl maleic, dichloromaleic acid. The term "unsaturated dibasic acid" is intended to include the corresponding anhydrides where such anhydrides can be formed from the dibasic acid.

The following generic formulas are applicable to the phosphoric acid esters contemplated by the present invention:

and

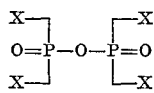

where X represents

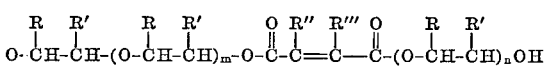

and wherein R and R' are selected from the group consisting of hydrogen, alkyl, aryl, alkaryl, aralkyl and cyclic alkyl radicals and their halogen substituted derivatives, wherein R" and R''' are selected from the group consisting of hydrogen, halogen and alkyl and wherein $m$ and $n$ are whole numbers from 0–3.

The foregoing compositions may be considered as unsaturated polyesters containing phosphorus. They are capable of undergoing polymerization to a limited degree without addition of crosslinking agents. Preferably, however, polymerization is accomplished by use of suitable crosslinking agents to obtain either thermosetting or thermoplastic resin, depending on the type and amount of crosslinking agent employed. Exemplary crosslinking agents are those which contain ethylenic unsaturation and undergo an addition reaction and, particularly, vinyl unsaturation, such as styrene, vinyl toluene, vinyl acetate, and acrylates, for example, methyl acrylate and methyl methacrylate. These crosslinking agents are employed in conjunction with catalysts suitable for initiating addition reactions such as the peroxide class of catalysts, for example, benzoyl peroxide, butyl perbenzoate, cumene hydroperoxide, and methyl ethyl ketone peroxide.

To obtain a thermoset type of end product upon crosslinking, the crosslinking agent should be used in amounts of generally less than fifty percent by weight of the phosphoric acid esters. If thermoplastic compositions are desired as an end product, a predominate amount of crosslinking agent should be used. Actually, in the latter situation the crosslinking agent, such as styrene, vinyl acetate, etc., serves as a major comonomer for the phosphoric acid ester rather than merely as a crosslinking agent in the normal sense. Hence, the characteristics of the final product from polymerization are appreciably influenced by the comonomer.

By way of further illustrating the invention without intending to limit the same, the following examples are presented:

Example I

To 98 gms. of orthophosphoric acid were slowly added, 555 gms. of epichlorohydrin, while maintaining the temperature at 100° C. during addition. The temperature was then raised to 120° C. After one hour at this temperature the reaction mass was cooled to 50° C. 275 gms. of maleic anhydride were next added to the product and mixed at 65° C. for 30 minutes. The temperature was then raised to 100° C. and 416 gms. of epichlorohydrin were added. After all of the epichlorohydrin had been added, the temperature was raised to 120° C. for 3 hours and then cooled to room temperature. The resulting product was an amber colored liquid, had a mild odor and was determined to have the following characteristics:

| | |
|---|---:|
| Acid number | 1.03 |
| Specific gravity at 25° C. | 1.384 |
| Viscosity (poise) at 25° C. | 9,420 |
| Specific resistivity (ohms) | 2,500,000 |
| Refractive index | 1.4979 |

Example II 60 gms. of the product prepared in Example I were added to 40 gms. of styrene monomer and 1 gm. of Lupersol DDM (60% methylethyl ketone peroxide in dimethyl phthalate). This mixture was permitted to cure for 72 hours at room temperature and resulted in a hard, clear casting with a light brown color. The product was infusible and rated as self-extinguishing by ASTM D-635.

Example III

To 378 gms. of orthophosphoric acid were slowly added, 742 gms. of propylene oxide at 45° C. This temperature was maintained 4 hours. Next, 1,070 gms. of maleic anhydride were added and the temperature raised to 100° C. for 8 hours and then cooled to room temperature. To this product, 1,110 gms. of propylene oxide were added at 60–70° C., this temperature being maintained for 4 hours. The reaction mass was then stripped of low boiling components at 100° C. and 450 mm. Hg pressure. The final product had the following properties:

| | |
|---|---:|
| Specific gravity at 25° C. | 1.157 |
| Refractive index at 25° | 1.4668 |
| Viscosity at 25° | 3,580 |
| Specific resistivity | 2,500,000 |
| pH | 1.7 |
| Acid number | 15.3 |

Example IV 20 gms. of material from Example III were added to 80 gms. of styrene monomer and 1 gm. of Lupersol DDM. This mixture was permitted to cure for 72 hours at room temperature. The resulting product was brown and soft but did not burn.

As indicated from the above examples, one characteristic of the present compositions resides in their ability to form cured resin systems having enhanced flame resistance or resistance to burning. This characteristic extends their utility into many areas not open to other resin systems.

While, as indicated, all hydroxyl groups associated with the phosphoric acids are preferably esterified in the manner proposed herein, it will be appreciated that in some instances, because of reaction conditions, quantity of reactants, etc., certain of the hydroxyl groups may remain unesterified or be only partially esterified. Such partial ester derivatives, which contain at least one esterified grouping of the type contemplated, are also deemed to be within the scope of the invention. Additionally, for some applications, it may be desirable to employ partial esters of phosphoric acids as a starting material in preparing the instant esters. Illustrative of such partial esters there may be cited in particular the mono alkyl esters of methanol, ethanol, propanol and the like with the acids of phosphorus.

Having described the invention and certain exemplary embodiments thereof, the same is only intended to be limited by the scope of the following claims:

We claim:

1. A phosphoric ester of the formula

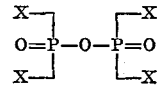

wherein X is the ester group

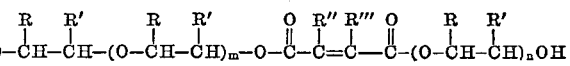

wherein R and R' are selected from the group consisting of hydrogen, a lower alkyl, and cyclic alkyl radicals and their halogen substituted derivatives, wherein R'' and R''' are selected from the group consisting of hydrogen, halogen and a lower alkyl and wherein $m$ is a whole number from 0–3 and $n$ is a whole number from 1–3.

2. A process of forming a phosphoric acid ester derivative which comprises reacting pyrophosphoric acid with an alkylene oxide, reacting the resulting ester with maleic acid and subsequently reacting the maleic acid reaction product with an alkylene oxide.

3. A process as described in claim 2 wherein the alkylene oxide is epichlorohydrin.

4. A composition as described in claim 1 wherein R, R'' and R''' are hydrogen and R' is $CH_2Cl$.

5. A composition as described in claim 1 wherein R', R'' and R''' are hydrogen and R is $CH_2Cl$.

6. A hard solid product obtained by the addition reaction of an ester as described in claim 1 and a compound containing vinyl unsaturation.

7. A hard solid product obtained by the addition reaction of an ester as described in claim 1 and styrene.

References Cited

UNITED STATES PATENTS

| | | | |
|---|---|---|---|
| 2,372,244 | 3/1945 | Adams et al. | 260—461 |
| 2,466,393 | 4/1949 | Dickey et al. | 260—461 |
| 2,557,805 | 6/1951 | Upson | 260—461 |
| 2,583,356 | 1/1952 | Brucksch et al. | 260—461 |
| 2,830,069 | 4/1958 | Smith | 260—461 |
| 3,061,625 | 10/1962 | Friedman | 260—461 |
| 3,094,549 | 6/1963 | Gurgiolo et al. | 260—461 |

FOREIGN PATENTS 560,741  7/1958  Canada.

HARRY WONG, JR., *Primary Examiner.*

U.S. Cl. X.R.

260—933, 952, 978